July 26, 1960 C. B. MYERS 2,946,653
AMMONIA-SODA PROCESS IMPROVEMENTS
Filed Sept. 5, 1956
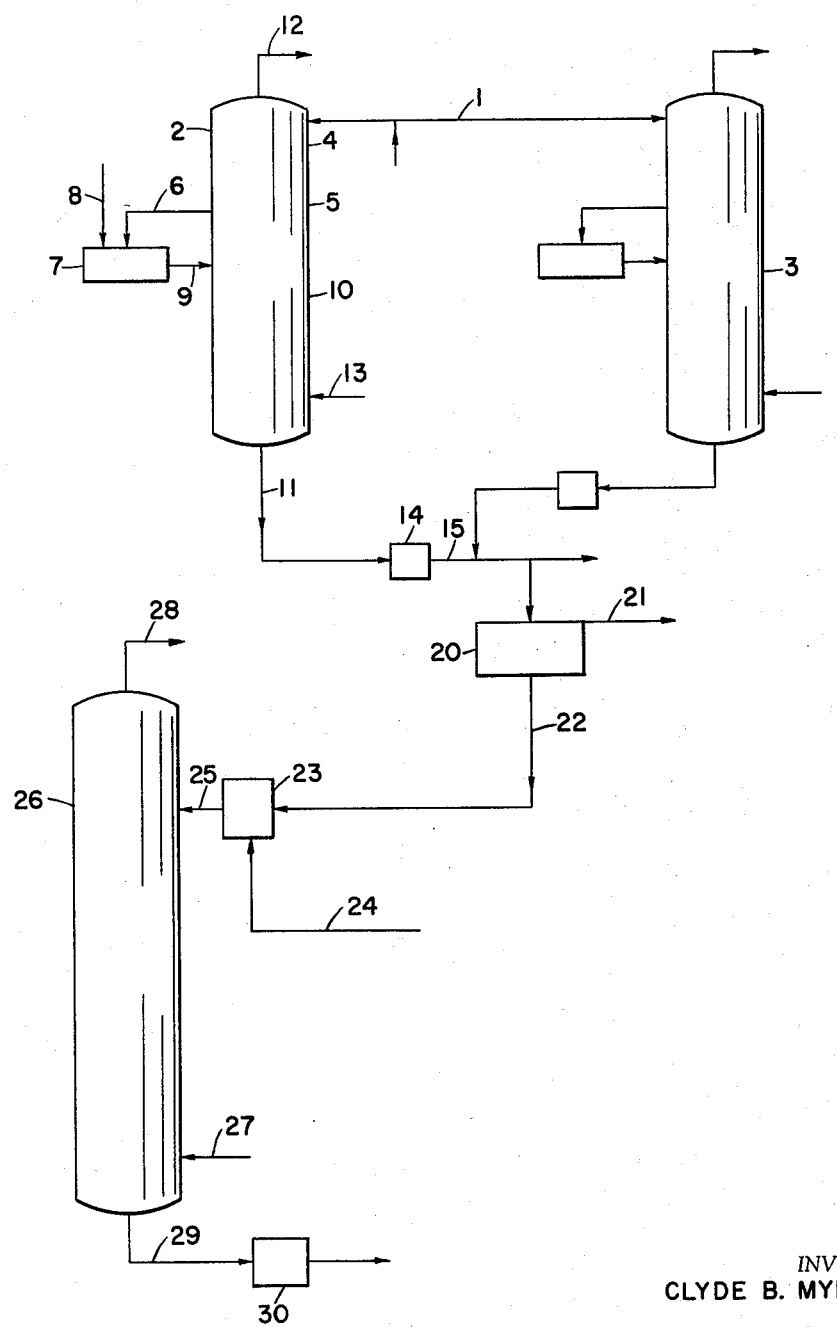
INVENTOR
CLYDE B. MYERS
BY
ATTORNEY United States Patent Office 2,946,653
Patented July 26, 1960

2,946,653
AMMONIA-SODA PROCESS IMPROVEMENTS

Clyde B. Myers, Painesville, Ohio, assignor to Diamond Alkali Company, Cleveland, Ohio, a corporation of Delaware Filed Sept. 5, 1956, Ser. No. 608,033

4 Claims. (Cl. 23—65)

This invention relates to a chemical process for the production of alkali metal carbonates. It is concerned more particularly with an improved method of operation in soda ash manufacture by the ammonia-soda process.

In the ammonia-soda process, soda ash is produced generally by contacting an ammoniacal solution of brine with carbon dioxide to form sodium bicarbonate, filtering said sodium bicarbonate and calcining the product to obtain sodium carbonate. The mother liquor from the bicarbonate filtering stage is subsequently treated to recover ammonia which is thereafter recycled to contact brine in an absorber unit as is well-known in the art.

The ammonia recovery stage in the conventional ammonia-soda plant generally involves treating the filtrate from the sodium bicarbonate filters with lime in an ammonia still where ammonia gas as a desired component is recovered for further use in the process. The liquor from the ammonia still or distiller liquor is thereafter disposed of, such as by leading to waste.

The efficiency of the ammonia recovery step which includes generally factors such as degree of utilization of the lime, ammonia loss, and the like, is an important step in the overall operation of an ammonia soda plant.

Heretofore, in the ammonia recovery step, manufacturers have found it necessary to accept an economic balance between ammonia loss and controllable operating variables such as rate, lime excess, and steam consumption. In such operation, therefore, it has been the practice to employ an excess of lime in order to insure complete decomposition of ammonium chloride and like compounds. Because of the nature of the reaction of ammonium chloride liquor and the lime (which depends on the rate of decomposition of the fixed ammonia by lime) the residence time provided in the ammonia still is ordinarily insufficient to allow all the desired reactions to take place with the result that utilization of all the lime and substantially complete recovery of all the ammonia is not accomplished. In consequence, appreciable quantities of lime and ammonia are sent to waste, thereby resulting in substantial revenue losses and costly operations.

Accordingly, a general object of this invention is a more efficient operation of the ammonia-soda process.

Another object of this invention concerns an improved process for operating the ammonia recovery stage.

A further object of this invention is a more efficient utilization of lime in the ammonia recovery stage.

A still further object of this invention is an improved process for the recovery and use of waste lime and ammonia in the ammonia-soda process. These and other objects will become apparent from a description of the invention and reference to the accompanying drawing which illustrates an embodiment for carrying out the process of this invention.

In accomplishment of the above objects, therefore, in the ammonia-soda process for the manufacture of soda ash wherein an ammonium chloride liquor is contacted with lime in an ammonia still, the invention is directed to the improvement comprising withdrawing a slurry containing lime from said still and contacting said slurry with a liquor containing ammonium salts. By the process of this invention advantageous results obtained are: a more efficient utilization of lime and of calcium carbonate salts in the heretofore waste liquors; a more efficient recovery of ammonia; better operating controls and realization of substantial savings in the overall process.

As indicated in the foregoing brief description of the invention, the process of this invention concerns the treatment of a slurry containing lime withdrawn from the ammonia still. Such slurry (dealt more fully with below) hereinafter referred to as distiller slurry, contains a substantial quantity of calcium salts which have not been fully utilized because of the relatively high rate of throughput of the reactants through the still, such high throughput being necessary in commercial operations.

Since the improved process of this invention generally begins with the filter liquors from the bicarbonate stage in an ammonia-soda process, a brief description of a conventional unit follows. In a conventional unit, the filter liquors from the sodium bicarbonate recovery zone, which consist of various salts of ammonia, are lead to an ammonia still to recover ammonia therefrom. In the ammonia still, which usually consists of a heat exchanger section, a stripper section and a distiller section, the filter liquor is first introduced to the heat exchanger section to recover or strip ammonia from all the ammonium compounds that are readily decomposable and/or volatilized by steam; these include (besides ammonia) ammonium bicarbonate, ammonium carbonate, ammonium sulfide, and the like. The "fixed" ammonia, i.e., compounds in the form of ammonium chloride and ammonium sulfate, requires lime for its liberation. The decomposition of fixed ammonia compounds is accomplished in the distiller section where they are contacted with lime.

In actual practice in some plants, lime is introduced in the form of a slurry or milk of lime by providing a pre-liming tank outside of the ammonia still. The reason for this is that the rate of decomposition of the fixed ammonia by lime is dependent upon the rate of hydration and solution of calcium oxide in the lime still and, therefore, in order to provide more time for ammonia liberation, the time of contact in the liquor is lengthened by the use of such a tank. In the preliming tank, the lime is contacted with liquor from the stripper section containing the fixed ammonia and thereafter the mixture is introduced to the distiller section as is well-known in the art.

As mentioned heretofore, lime is introduced into the distiller section in some excess in order to enhance the recovery of ammonia from the fixed ammonia compounds. The amount of excess lime used is, of course, also dictated by other considerations such as steam consumption, ammonia loss, etc., all of which are tied in some way to the economics of operation. As a result of such methods of operation, the loss of lime in the distiller slurry is comparatively high. Furthermore, since the rate of throughput is high, favorable reaction conditions such as alkalinity of the liquor are not fully utilzed. Thus, the alkalinity of the lime and calcium carbonate in the liquor is lost to some extent because the reaction of calcium carbonate with, for example, ammonium chloride, requires prolonged contact. Additionally, the decomposition of ammonium chloride with lime is in most instances not satisfactorily accomplished even with the use of excess lime and this excess lime finds its way to the distiller slurry which is withdrawn from the still, therby containing appreciable quantities of lime, calcium carbonate, calcium chloride and ammonia, all of which are wasted.

In the process of this invention it is found that advantageous results are obtained by supplying a constant amount of lime to the prelimer, which amount is in excess of even that required under the most unusual conditions, withdrawing from the ammonia still a slurry containing lime and pumping it to a settling zone for further processing as indicated below. In the settling zone or settler, the particles of unreacted lime, as well as other unutilized reactants such as calcium carbonate, settle rapidly while the overflow from the mixture is withdrawn to waste. The settled slurry, which contains lime, calcium carbonate, and the like, is withdrawn as underflow and thereafter introduced to a prelimer tank. The slurry of solids in the prelimer is then contacted with an ammonium chloride liquor which has been treated to reduce some ammonia and substantially all of its $CO_2$. This ammonium chloride liquor can be the filtrate from the bicarbonate filters after being treated to reduce it of free ammonia and $CO_2$, or it can be from any other suitable source. The slurry from the prelimer is then introduced to an ammonia distiller or "scavenger" still where the lime and a substantial portion of the calcium carbonate are fully utilized to liberate ammonia in a manner well-known. The draw-off liquor from the scavenger still may optionally be led to a heat trap to recover heat from the liquor and then disposed of in any suitable manner. The most striking advantages realized by this operation are: a longer contact time is provided for the reaction of the lime and calcium carbonate with the ammonium salts in the prelimer and scavenger still; the main ammonia still or stills can operate with excess lime at all times without the necessity of rigid and multiple units control such as is required when only a slight excess is used in the conventional process in the losses of lime, calcium carbonate and ammonia in the distiller liquor from the scavenger still are substantially reduced, thereby resulting in substantial savings in the operation.

It is not practical to specify quantities of distiller liquor treated by the process of this invention since the amount of distiller slurry containing lime from the ammonia recovery still to be processed, according to this invention, will depend on the size of the plant and its operating conditions. Such factors are well-known in the art. Lime is employed in an amount sufficient to be in excess of even the most unusual conditions and there is no apparent criticality concerning the amount used. It will be understood that this lime excess eventually finds its way into the distiller slurry which is then treated according to this invention.

The amount of ammonium salt containing liquor introduced to contact the slurry of solids from the settler should be sufficient to react with the excess lime and calcium carbonate from the ammonia still. These amounts, as well as the operating conditions of the scavenger still, can readily be determined by those skilled in the art.

In order that the process of this invention be more fully understood, reference is made to the accompanying drawing wherein 1 represents a line for introducing filter liquor from the bicarbonate filters (not shown) to an ammonia still 2 or plurality of stills 2 and 3. In the ammonia still, the filter liquor is introduced into the heat exchanger section 4 from whence it flows to the stripper section 5. From the stripper section 5 a line 6 withdraws the liquor to the prelimer 7 where it is contacted with lime introduced by line 8. It should be understood that a portion of the liquor from the stripper section can be advantageously withdrawn at this point to contact it with the distiller slurry in accordance with the process of this invention. The slurry of lime and liquor is then introduced by a line 9 to the distiller section 10 of the ammonia still. The mixture subsequently flows downwardly to a draw-off line 11 while ammonia, water and carbon dioxide are withdrawn at line 12 at the top of the column. Steam is introduced to the still by a line 13 and led to the stripper and heat exchanger sections as is well-known in the art. The distiller slurry is then led by line 11 to a heat trap 14 and then by a line 15 to settler 20. From settler 20 the overflow from the distiller slurry is withdrawn to waste by line 21. Line 22 then conveys the underflow slurry to prelimer 23 where it is contacted with an ammonium chloride liquor from line 24, which liquor can be obtained from the stripper section of the ammonia still. After thorough contact in prelimer 23, the mixture is introduced by a line 25 to the scavenger still represented generally by 26. In the scavenger still, which operates essentially as ammonia still 2, the mixture is contacted with steam from line 27 while ammonia, carbon dioxide and water are withdrawn at line 28 at the top of column as indicated. The draw-off liquor from the still is withdrawn through line 29, led to heat trap 30 (optional) and finally to waste.

The settler 20 can be any conventional settler known in the art. High throughput rates are possible in the settler because the solids settle rapidly and high clarity of the overflow is not required. The liquor used to contact the distiller slurry in the settling zone is, as indicated, preferably reduced of free ammonia and $CO_2$ as in the stripper section of the ammonia still. The fixed ammonia in the form of ammonium chloride and ammonium sulfate in the liquor is then contacted with the stripper liquor.

In present day commercial plants producing thousands of tons of soda ash per day, thousands of tons of lime or its equivalent are lost monthly as mixed solids in the distiller waste. Despite operating with rather precise control of lime in the ammonia recovery stills, hundreds of pounds of ammonia per day are also regularly lost in the distiller slurry. It can be readily seen that even assuming that only half of these materials are recovered by the process of this invention, that the economies of the plant operation would be favorably enhanced.

Having thus described this invention, with reference to one mode of operation, its advantages and results, it is intended to cover all aspects herein described and the true scope is to be limited only by the spirit of the invention and the scope of the appended claims.

What is claimed is:

1. In the ammonia-soda process wherein a liquor from the stripper section of an ammonia still is treated with lime, the improved process which comprises withdrawing a slurry containing lime from said ammonia still to a settling zone, withdrawing the underflow of said slurry from said settling zone, said underflow comprising lime and calcium carbonate, and treating said underflow with an ammonium salt-containing liquor, the ammonium salt in said liquor being in a quantity substantially stoichiometrically equivalent to the quantity of lime in said underflow so as to react with substantially all the lime in said underflow.

2. An improved method of operating the ammonia-soda process, comprising treating a sodium bicarbonate filter liquor with excess lime in an ammonia still, withdrawing a slurry containing lime from said treating step to a settling zone, with drawing a portion of said slurry from said settling zone, said portion comprising lime and calcium carbonate, and treating said portion with an ammonium chloride liquor, the ammonium chloride in said liquor being present in an amount substantially stoichiometrically equivalent to the lime in said portion so as to react with substantially all of said lime.

3. An improvement in the ammonia-soda process for soda ash manufacture comprising introducing a sodium bicarbonate filter liquor containing ammonia, carbon dioxide and ammonium salts to an ammonia still, adding an excess of lime to said still, the amount of said lime added being sufficient to provide an excess regardless of the theoretical amount required to react with the ammonium salts in said filter liquor, so that the amount of lime added does not vary, withdrawing from said still to a settling zone a slurry comprising calcium compounds selected from the group consisting of calcium carbonate and calcium oxide, withdrawing the underflow of said slurry from said settling zone, said underflow comprising lime and calcium carbonate, and treating said underflow in a scavenger still with a liquor comprising ammonium salts selected from the group consisting of ammonium chloride and ammonium sulfate in quantities substantially stoichiometrically equivalent to the compounds of calcium in said underflow, so as to react with substantially all the compounds of calcium in said underflow, to separate ammonia and carbon dioxide from said liquor.

4. In the ammonia-soda process for the manufacture of soda ash wherein the sodium bicarbonate filter liquor containing ammonia, carbon dioxide, and ammonium salts, is treated with an excess of lime in an ammonia still, the improvement which comprises adding the excess of lime to the filter liquor in the ammonia still, the amount of said lime added being sufficient to provide an excess regardless of the theoretical amount required to react with the ammonium salts in said filter liquor, so that the amount of lime added does not vary, withdrawing from said still a slurry containing any unreacted lime and calcium carbonate, passing said slurry to a settling zone, withdrawing the underflow of said slurry from the settling zone, said underflow comprising lime and calcium carbonate, and treating said underflow with an ammonium salt-containing liquor, the amount of ammonium salt in said liquor being substantially stoichiometrically equivalent to the lime and calcium carbonate in said underflow, so as to react with substantially all the lime and calcium carbonate in said underflow.

References Cited in the file of this patent

UNITED STATES PATENTS

| | | |
|---|---|---|
| 2,603,555 | Hulme | July 15, 1952 |
| 2,781,245 | Robertson et al. | Feb. 12, 1957 |